US010563716B2

(12) United States Patent
Foucoin et al.

(10) Patent No.: US 10,563,716 B2
(45) Date of Patent: Feb. 18, 2020

(54) DISK BRAKE COMPRISING AT LEAST ONE SPRING FOR THE ELASTIC RETURN OF A BRAKE PAD, ELASTIC RETURN SPRING, AND REPLACEMENT KIT

(71) Applicant: FOUNDATION BRAKES FRANCE, Drancy (FR)

(72) Inventors: Alexandre Foucoin, Montevrain (FR); Didier Montegu, Livry Gargan (FR); Xavier Labarre, Saint Georges du Bois (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 0 days.

(21) Appl. No.: 15/547,556

(22) PCT Filed: Feb. 5, 2016

(86) PCT No.: PCT/EP2016/052469
§ 371 (c)(1),
(2) Date: Jul. 31, 2017

(87) PCT Pub. No.: WO2016/124728
PCT Pub. Date: Aug. 11, 2016

(65) Prior Publication Data
US 2018/0023643 A1   Jan. 25, 2018

(30) Foreign Application Priority Data

Feb. 6, 2015  (FR) ..................................... 15 50928
Feb. 25, 2015  (FR) ..................................... 15 51607

(51) Int. Cl.
*F16D 65/097*    (2006.01)
*F16D 55/227*    (2006.01)
(Continued)

(52) U.S. Cl.
CPC ....... *F16D 65/0972* (2013.01); *F16D 55/227* (2013.01); *F16D 65/0043* (2013.01); *F16D 65/40* (2013.01)

(58) Field of Classification Search
CPC .. F16D 65/097; F16D 65/0979; F16D 55/227; F16D 65/0972; F16D 65/40; F16D 65/52
(Continued)

(56) References Cited

U.S. PATENT DOCUMENTS 4,629,037 A * 12/1986 Madzgalla .............. F16D 65/54
                                                                    188/71.8
9,279,466 B2 * 3/2016 Miura ................. F16D 65/0977
(Continued)

FOREIGN PATENT DOCUMENTS

EP    2 792 899 A1    10/2014
FR    2 925 636 A1    6/2009
(Continued)

OTHER PUBLICATIONS

EP 2792899 machine translation, Mahoudeaux, Oct. 22, 2014. (Year: 2014).*
(Continued)

*Primary Examiner* — Thomas J Williams
(74) *Attorney, Agent, or Firm* — Young & Thompson

(57) ABSTRACT

Disclosed is a disc brake of a motor vehicle including a brake disc, a stationary holder, a brake pad mounted such that it slides axially in the stationary holder, and at least one elastic return spring for the elastic return of the brake pad towards the idle position thereof. The elastic return spring includes a portion for fixing the spring to the stationary holder, which includes a rigid fixing blade received in a complementary machined part of the stationary holder of the disc brake.

21 Claims, 8 Drawing Sheets

(51) Int. Cl.
*F16D 65/40* (2006.01)
*F16D 65/00* (2006.01)

(58) Field of Classification Search
USPC .............................................. 188/72.3, 73.38
See application file for complete search history.

(56) References Cited

U.S. PATENT DOCUMENTS

| | | | |
|---|---|---|---|
| 10,030,729 B2* | 7/2018 | Foucoin | F16D 55/225 |
| 2009/0159376 A1 | 6/2009 | Rossignol et al. | |
| 2010/0187050 A1* | 7/2010 | Hayashi | F16D 65/097 |
| | | | 188/72.3 |
| 2011/0168503 A1* | 7/2011 | Chelaidite | F16D 65/0972 |
| | | | 188/73.31 |

FOREIGN PATENT DOCUMENTS

| | | |
|---|---|---|
| FR | 3 004 500 A1 | 10/2014 |
| JP | H06109041 A | 4/1994 |
| JP | 2012063014 A | 3/2012 |

OTHER PUBLICATIONS

International Search Report, dated May 25, 2016, from corresponding PCT/EP2016/052469 application.
FR Search Report, dated Feb. 24, 2016, from corresponding FR1551607 application.

* cited by examiner

DISK BRAKE COMPRISING AT LEAST ONE SPRING FOR THE ELASTIC RETURN OF A BRAKE PAD, ELASTIC RETURN SPRING, AND REPLACEMENT KIT

TECHNICAL FIELD OF THE INVENTION

The invention relates to a disc brake for an automotive vehicle.

The invention relates in particular to a disc brake an elastic return spring of a brake pad of which includes means for compensating for the wear play of a friction lining of the brake pad.

TECHNICAL BACKGROUND OF THE INVENTION

The invention relates for example to a disc brake for an automotive vehicle of the type described and represented in French patent application FR-A1-3.004.500 which includes:
- a brake disc which extends in a plane transverse to an axial orientation axis of rotation of the disc;
- a support fixed with respect to a vehicle chassis;
- at least one brake pad each of which includes a friction lining a friction transverse face of which cooperates with an associated brake track of the disc, the brake track being axially slidingly mounted in the support between an active front position in which said friction face bears on the associated annular track of the disc, and an inactive rear position in which said friction face is axially spaced from said associated annular track of the disc, by a determined operating play;
- at least one spring for the elastic return of the brake pad to its inactive position, which is for example interposed between the brake pad and the support.

In a disc brake, the sliding of the brake pads to their active position is controlled by a piston. Both brake pads thereby strongly pinch the disc to slow down its rotation. The braking operation is thereby an active operation.

The brake pads are pushed back to their inactive position by the rotating disc. This is thereby a passive operation.

However, it occurs that the disc does not push back the brake pads with a sufficient force to space them apart at a sufficient distance from the disc. This can for example happen when the sliding of the brake pads is of insufficient quality, or even jammed, or if the design creates some "restoration".

Even though the brake pads are not actively tightened against the disc anymore, each of the annular tracks of the same however undergoes a permanent friction with the friction lining carried by the associated brake pad. Therefore, the friction linings undergo a premature non-operational wear.

Furthermore, this permanent friction is likely to cause a temperature rise harmful to some members of the disc brake.

This permanent friction also causes the occurrence of a residual torque which opposes to the disc rotation. This increases the vehicle consumption, while decreasing the vehicle performance.

To solve this wear and temperature rise problems, the previously mentioned document provides a disc brake in which the elastic return spring includes means for compensating for a wear play of the friction lining of the brake pad which are plastically deformed when the stroke of the brake pad to its active position is higher than said determined operating play.

To that end, the elastic return spring, which is interposed between the fixed support of the disc brake and an associated brake pad, includes at least one axial orientation segment which is elastically deformable by traction between an idle state and a maximum elongation state the value of which is equal to the determined operating play, the spring including at least one plastically deformable segment, under the effect of an axial traction strain, forming said means for compensating for the wear play, this plastically deformable segment being shaped to be plastically elongated when the stroke of the brake pad to its active position is higher than the determined operating play.

In this document, the elastic return spring includes an attachment portion for attaching the elastic return spring to the fixed support, and a rigid connecting branch with a generally axial orientation the free end segment of which is shaped to cooperate with the associated brake pad. According to another known design, the free end segment is attached to the brake pad.

In this document, the attachment portion for attaching the elastic return spring is hairpin-shaped with a tongue which includes a body which axially extends and continues to an elastic expansion leg which is folded rearwardly against the body, forming a front fold forming a hinge at the front end of the tongue.

The tongue and the expansion leg are received in a notch of a housing of the fixed support which has a complementary transverse cross-section in order to enable the return member to be vertically immobilised.

Such a design in particular requires a shape of the notch, which is difficult to machine and requiring a pinning operation, and results in a complex mounting of the attachment part, in particular when the housing includes a guide rail, because due to its hairpin shape, the attachment portion overlaps a vertical bottom of the guide rail.

BRIEF SUMMARY OF THE INVENTION

In order to overcome this drawback, the invention provides a disc brake characterised in that it includes:
- a brake disc which extends in a plane transverse to an axial orientation axis of rotation of the disc;
- a fixed support which is fixed with respect to a vehicle chassis;
- at least one brake pad which includes a vertical transverse plate which carries a friction lining a friction transverse face of which cooperates with an associated brake track of the disc, the brake pad being axially slidingly mounted in the fixed support between an active front position in which said friction face bears on the associated brake track of the disc, and an inactive rear position in which said friction face is axially spaced from said associated brake track of the disc, by a determined operating play;
- and at least one spring for the elastic return of the brake pad to its inactive position including at least one attachment portion for attaching the elastic return spring on the fixed support and including a connecting branch which is directly or indirectly connected to the brake pad, and wherein said at least one brake pad includes at least one slidably guiding side lug which is received in an axial orientation slider of the fixed support;

characterised in that the attachment portion for attaching the elastic return spring to the disc brake includes a rigid blade which extends in a plane parallel to the axial displacement direction of the brake pad, and which is axially inserted in said axial orientation slider of the fixed support.

According to other characteristics of the disc brake:

the blade is planar and rigid with parallel edges and is axially inserted and housed in a complementary notch of said slider;

said slider has, in a cross-section by a vertical transverse plane orthogonal to the axis of rotation of the disc, a "C" shape transversally open to the associated side lug of the brake pad;

the slider is transversally delimited by an axial orientation vertical bottom;

said notch is formed in said vertical bottom;

said notch is made by machining;

the disc brake includes a guide rail which snugly fits into the walls of said slider and which is attached to the fixed support; and the blade is transversally arranged between said vertical bottom and a vertical orientation bottom facing said guide rail;

the attachment portion for attaching the elastic return spring to the fixed support includes a stop which is in contact with a face facing the fixed support to block the axial sliding of the elastic return spring in the direction corresponding to the axial displacement of the brake pad to its active braking position;

said stop belongs to a stop leg which extends from an axial orientation edge of the elastic return spring;

the attachment portion for attaching the elastic return spring to the fixed support includes a stabilising leg of the elastic return spring which cooperates with a portion of said slider;

said stabilising leg transversally and horizontally extends from an axial orientation edge of the elastic return spring;

said slider is vertically delimited by an axial orientation horizontal bottom;

said stabilising leg extends to an axial vertical orientation mouth a free end edge of which is received in an axial groove which is formed in said horizontal bottom of said slider;

said connecting branch is an axial orientation rigid branch parallel to the sliding direction of the brake pad;

the elastic return spring includes means for compensating for a wear play of the friction lining of the brake pad, which are plastically deformed when a stroke of the brake pad to its active braking position, is higher than said determined operating play;

the elastic return spring is made as a single piece by cutting and forming a material sheet.

The invention provides an axial elastic return spring of a brake pad which includes:

an attachment portion for attaching the elastic return spring to the disc brake; and a connecting branch which is directly or indirectly connected to the brake pad;

characterised in that the attachment portion for attaching the elastic return spring to the disc brake includes a rigid blade which extends in a plane parallel to the axial displacement direction of the brake pad, to be axially inserted in a complementary portion of the disc brake.

According to other characteristics of the elastic return spring:

the attachment portion for attaching the elastic return spring to the disc brake includes a stop to cooperate with a face facing the disc brake to block the axial sliding of the elastic return spring in the direction corresponding to the axial displacement of the brake pad to its active braking position;

said stop belongs to a stop leg which extends from an axial orientation edge of the elastic return spring;

the attachment portion for attaching the elastic return spring to the fixed support includes a stabilising leg for stabilising the elastic return spring which cooperates with a portion of said slider;

said stabilising leg transversally and horizontally extends from an axial orientation edge of the elastic return spring;

said connecting branch is an axial orientation rigid branch parallel to the sliding direction of the brake pad;

the spring includes means for compensating for a wear play of a friction lining of the brake pad, which are interposed between said attachment portion and said connecting branch, and which are plastically deformed when a stroke of the brake pad, along an axial displacement direction to an active braking position, is higher than a determined operating play;

the spring is made as a single piece by cutting and forming a material sheet.

The invention provides a replacement kit for a disc brake for an automotive vehicle according to the invention, characterised in that it includes at least one brake pad and two elastic return springs paired with said brake pad each of which is made according to the invention.

The replacement kit can further include two springs for mounting the brake pad into the disc brake.

BRIEF DESCRIPTION OF THE FIG.

Further characteristics and advantages of the invention will appear upon reading the detailed description that follows for the comprehension of which the appended drawings will be referred to wherein.

DETAILED DESCRIPTION OF THE FIG.

In the following of the description, elements having an identical structure or analogous functions will be designated by the same references.

In a non-limiting way and without reference to earth gravity, axial, vertical and transverse orientations will be assumed in reference to the "A,V,T" trihedron of the Fig.

The axial orientation "A" is directed from rear to front, in parallel with an axis "B" of rotation of the disc 12.

The horizontal plane is defined as being the transverse axial plane.

Figure 1:
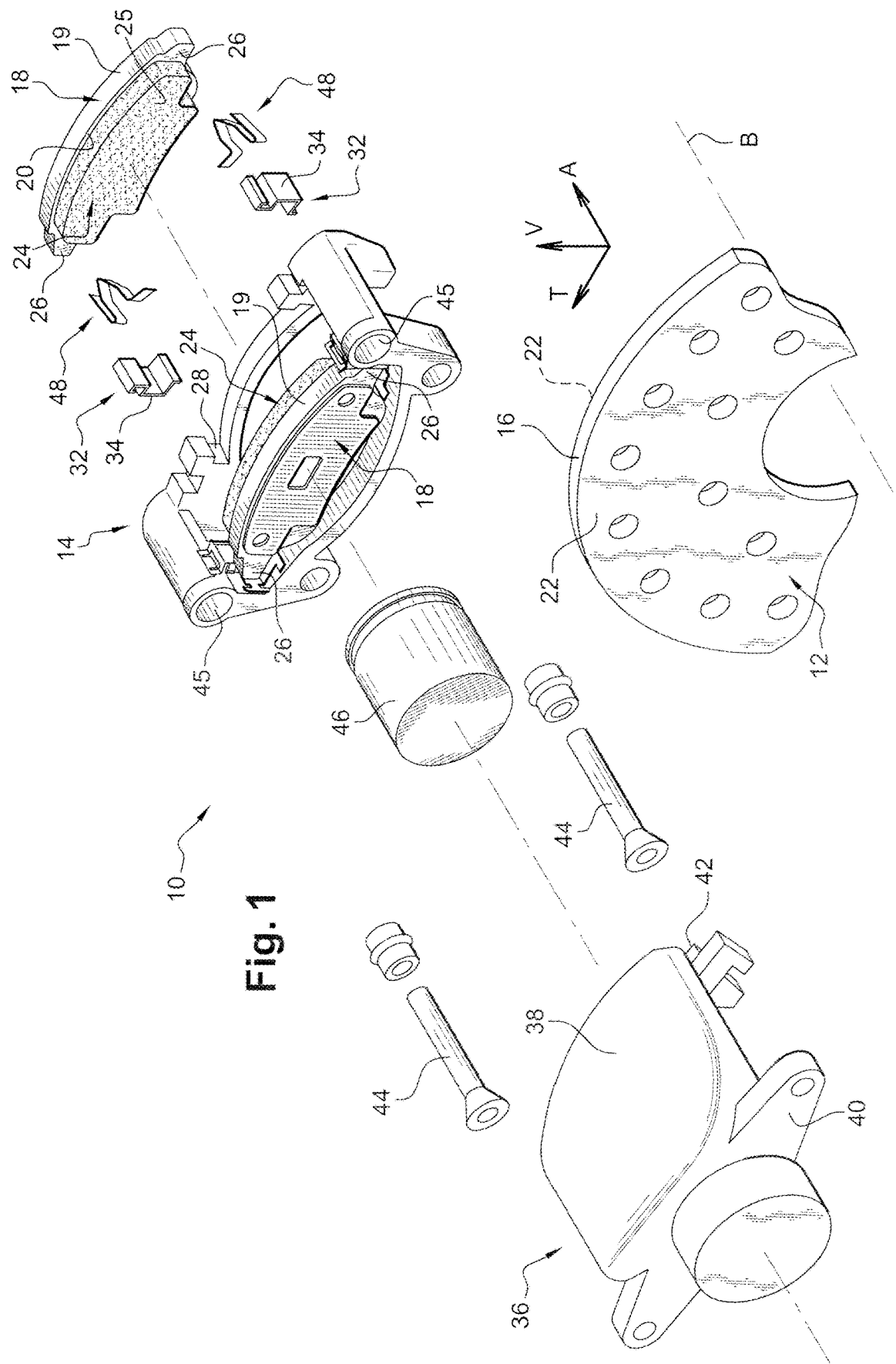
FIG. 1 is a perspective exploded view which represents a disc brake including an exemplary elastic return spring as a single piece according to the state of the art.
Figure 2:
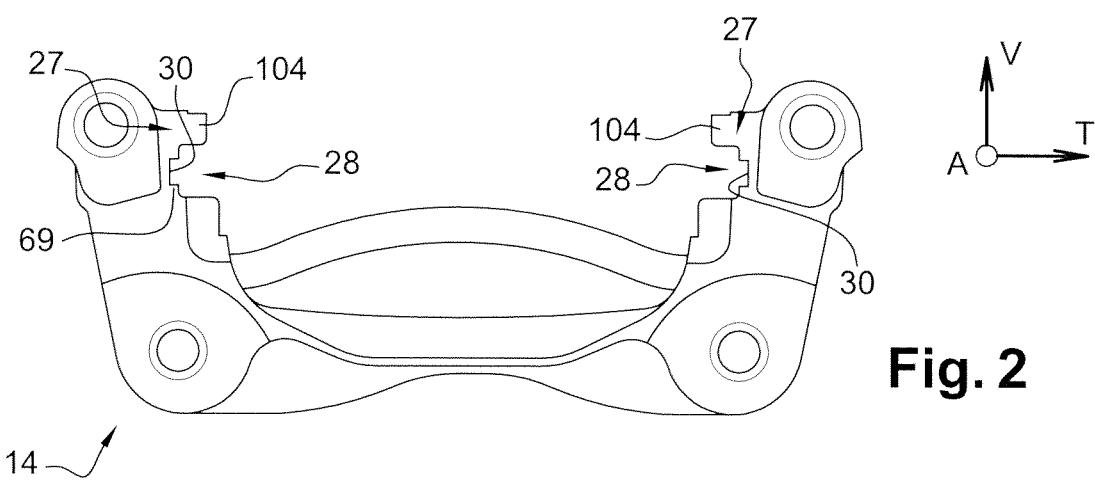
FIG. 2 is a front face which represents the fixed support of the disc brake of FIG. 1 provided with sliders for receiving elastic return springs of an associated brake pad.

In FIG. 1 is schematically represented a disc brake 10 for an automotive vehicle. This is a disc brake 10 with a so-called "floating caliper" or "sliding caliper".

In a known manner per se, the disc brake includes a disc 12 which is rotatably mounted about an axial orientation axis "B" of rotation. The disc 12 is rotatably integral with a wheel (not represented) of the automotive vehicle.

The disc brake 10 includes a support 14, also called a fork joint, which is fixedly mounted to the chassis (not represented) of the vehicle. The fixed support 14 overlaps a peripheral edge 16 of the disc 12.

Two opposite rear and front (also called inner and outer) brake pads 18 are axially slidingly mounted into the fixed support 14 on either side of the disc 12.

Both rear and front brake pads 18 have a structure and arrangement on the fixed support 14 which are symmetrically identical with respect to a median vertical transverse plane.

In the following, only the rear brake pad 18, at the left considering FIG. 1 will be described, the description being applicable to the front brake pad 18 by reversing front and rear directions.

The rear brake pad 18 is in the form of a vertical transverse plate 19 forming a support for a friction lining. The rear brake pad 18 has a front face 20, which is oriented to a rear face 22 facing the disc 12 which is in the form of an annular track. The front face 20 carries a friction lining 24 a friction front transverse vertical face 25 of which is able to cooperate with the face 22 of the disc 12.

Each of the opposite transverse ends of the brake pad 18 includes a side lug 26 which is slidingly mounted, with a play, in an associated slider 28 of an associated arm 27 of the fork joint or fixed support 14.

Each slider 28 is of an axial orientation and has, in a cross-section through a vertical transverse plane orthogonal to the axes A and B, a "C" shape transversally open to the associated side lug 26 of the brake pad 18. The slider 28 is transversally delimited by an overall vertical axial orientation bottom 30. Besides the vertical bottom 30, the slider is delimited by an upper horizontal bottom 33 and a lower horizontal bottom 35, both of an axial orientation.

In the example represented in the Fig., a guide rail 32 is transversally interposed between each side lug 26 and the associated slider 28.

Figure 4:
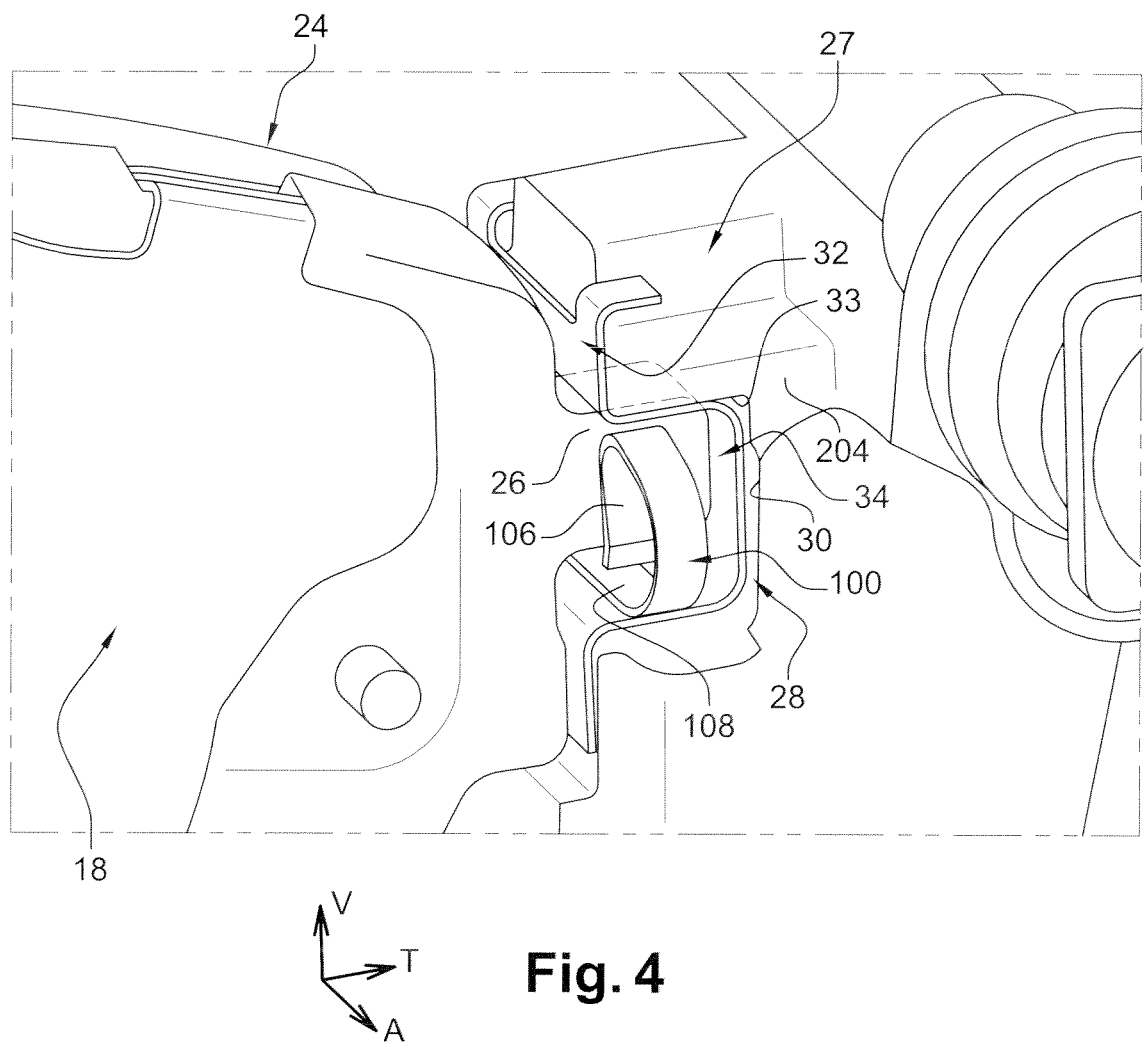
FIG. 4 is a partial perspective view illustrating the assembly of a brake pad with a radial spring in an arm of a fixed support forming fork joint provided with an insert guide rail.

Each guide rail 32 is a lamellar element formed by a C-cross-section leaf spring which snugly fits the walls of the associated slider 28 (see in particular FIG. 4).

The slider includes a sliding bearing upper wing, with a generally horizontal orientation, which is interposed between the lug 26 of the brake pad 18 and the upper bottom 33 of the housing 28, a vertical orientation bottom 34, which is interposed between the lug 26 of the brake pad and the vertical bottom 30, and an elastic holding wing which is arranged under the lug 26 of the brake pad 18.

The guide rail 32 thus includes a vertical axial orientation bottom 34 which is arranged opposite the vertical bottom 30 of the slider 28.

The guide rail 32 allows for a determined movement degree of the brake pad 18 in the fixed support 14, namely generally but in non-limiting way, an axial sliding movement, and a transverse sliding movement accompanying the rotation of the disc 12, during a braking action.

Figure 3A:
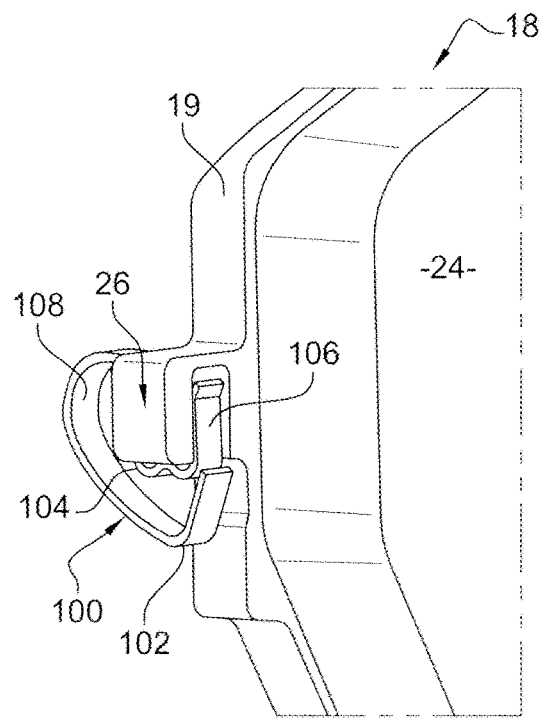
FIG. 3A is a schematic perspective view which illustrates an exemplary embodiment in which each lug of a brake pad is equipped with a "radial" spring.
Figure 3B:
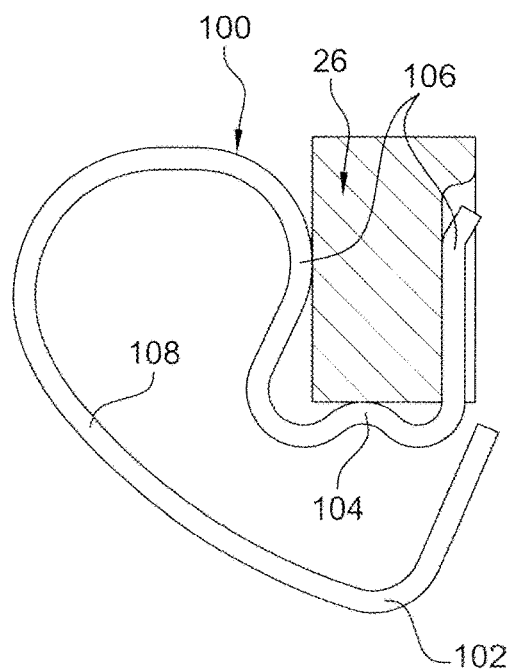
FIG. 3B is a detail view of the representation of FIG. 3A.

In a non-limiting way, each side lug 26 can be equipped with a so-called mounting spring, of the type described and represented in document FR-A1-2.925.636 and an example of which is illustrated in detail in FIGS. 3A, 3B and 4.

FIG. 4 illustrates the assembly of a mounting spring on a side lug 26 and the mounting of the lug thus equipped in an associated guide rail 32.

In FIGS. 3A, 3B and 4, is schematically represented a spring 100 for mounting the brake pad 18, also called a radial spring, likely to equip the lugs 26 with a brake pad 18 for mounting and guiding the brake pad 18 in the associated axial sliders 28 of the fixed support 14 with the presence of the guide rails 32 or not.

In a known manner, each pad spring 100 includes a sliding lower branch 102 which cooperates with a lower horizontal bottom 35 of the associated slider and which biases an upper horizontal facet of the lug 26 upwardly vertically bearing on the upper horizontal bottom 33 facing the slider 28.

According to the arrangement illustrated, the pad spring 100 is commonly called a "helical spring" and it includes a branch 104 bearing under a horizontal lower facet of the lug 26 of the brake pad 18, this branch 104 being part of an attachment branch, or fastener 106 which elastically pinches the lug 26 to ensure attachment of the pad spring 100 to the lug 26.

The pad spring 100 further includes a curved branch 108 which connects the attachment branch 106 to the sliding lower branch 102 by mainly ensuring elasticity of the pad spring 100.

The brake pad 18 is thus slidingly mounted along an axial direction, parallel to the axis of rotation B of the disc 12, in the fixed support 14 over an operating stroke between:
  an active front position in which the friction front transverse face 25 of the friction lining 24 bears on the face 22 facing the disc 12; and
  an inactive rear position in which the friction front transverse face 25 of the friction lining 24 of the brake pad 18 is axially spaced apart from the associated face 22 of the disc 12, by a determined operating play "J1".

During a braking operation, the tightening of the brake pads 18, from their inactive position to their active position, is controlled by a brake caliper 36 of the disc brake 10.

In a known manner, the caliper 36 includes an arch 38 which axially extends above the fixed support 14 by covering it and two rear 40 and front 42 wings which radially extend from rear and front end edges of the arch 38 to the axis "B".

The front ring 42 extends facing the front brake pad 18, and the rear ring 40 extends facing the rear brake pad 18.

The caliper 36 is here axially slidingly mounted to the fixed support 14 through to guiding parallel pillars 44 each of which is slidably received in an associated axial bore 45 of the fixed support 14.

In a known manner, the rear ring 40 of the caliper 36 carriers at least one axial piston 46 a bearing front transverse face of which is likely, during a braking operation, to cooperate with the transverse face facing the rear brake pad 18 to axially forwardly bias it, to exert an axial tightening strain of the friction front transverse face 25 of the friction lining 24 bearing on the face 22 facing the disc 12.

In response, the caliper 36 axially rearwardly slides and, symmetrically, the front ring 42 biases the front braking pad 18 to tighten the friction rear transverse face 25 of the friction lining 24 of the front brake pad 18 bearing against the front face 22 facing the disc 12.

When, at the end of the braking operation, the piston 46 terminates biasing the rear brake pad 18, the return of the brake pads 18, from their active position to their inactive position, is generally caused by the rotation of the disc 12 which "pushes back" each brake pad 18 to its inactive position.

However, in some cases, it has been observed that the pushing back force exerted by the disc 12 is not sufficient to push back each of the brake pads 18 to its respective inactive position. The friction lining 24 of the brake pads 18 thus continues to cause a friction against the disc 12, whereas no tightening action of the friction linings of the brake pads by the caliper 36 is controlled.

At the end of a braking operation, to ensure that each brake pad 18 comes back to an inactive position, the disc brake 10 is equipped with means for the elastic return of the brake pad 18 to its inactive position. These elastic return means are made as elastic return springs which are interposed between the brake pad 18 and the fixed support 14.

The disc brake 10 includes, by way of non-limiting example four elastic return springs 48, also called "spacer" springs, each of which—by way of non-limiting purpose—is here arranged between an arm 27 of the fixed support 14 and an associated side lug 26 of a brake pad 18.

Thus, a rear or front brake pad 18 is here associated with two elastic return springs 48 each of which cooperates with the friction lining-carrying plate 19.

In a non limiting way, the four elastic return springs 48 are of a same overall design and they are arranged in the same way on the fixed support 14. The design principle of a single of these elastic return springs 48 of the rear brake pad 18 will thus be described herein in detail.

An elastic return spring 48 is in the form of a metal strip, for example of steel, with a rectangular cross-section the width of which vertically extends and which is made for example by cutting, drawing and folding a stainless steel sheet with a constant thickness.

Figure 5:
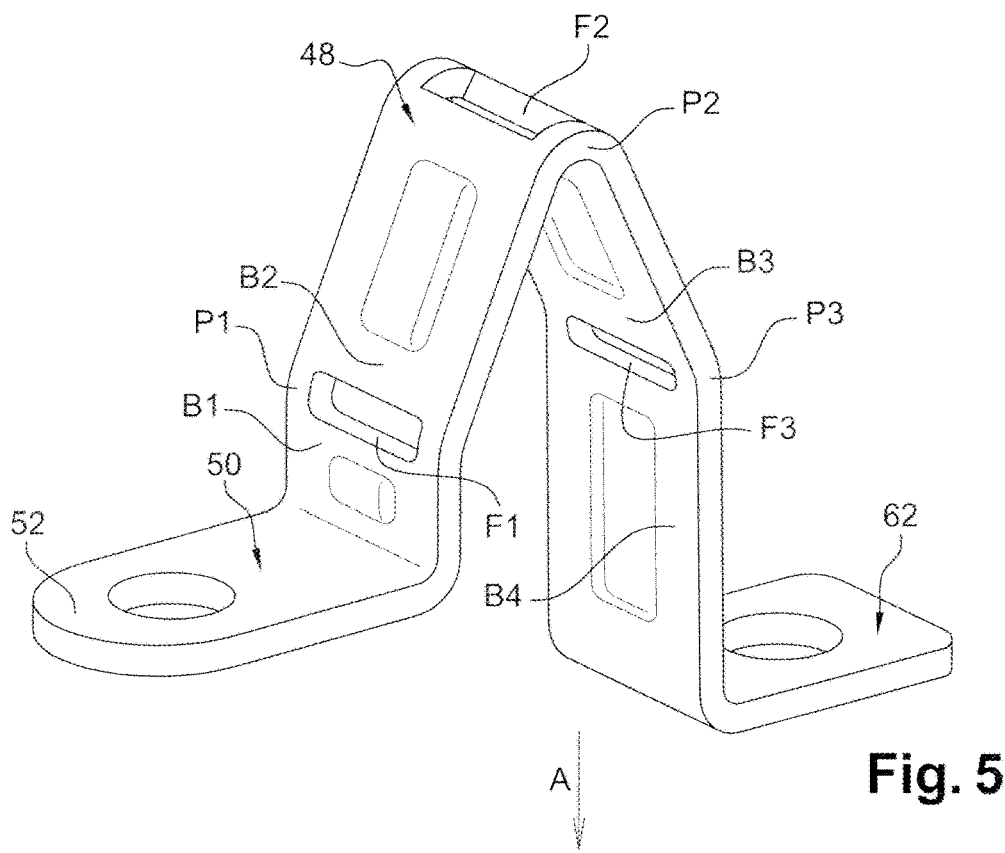
FIG. 5 is a perspective detail view which represents an elastic return spring of the plastically deformable one-piece brake pad according to an alternative design.

By referring in particular to FIG. 5, an elastic return spring 48 includes a so-called attachment first portion 50, having generally the shape of an attachment leg 52 for attaching the spring 48 to the fixed support 14, which is connected to the end of a first rigid branch B1 and which extends in an orthogonal plane to be attached, for example by riveting, to an associated part of the fixed support 14.

From the first rigid rectilinear axial orientation branch B1, the elastic return spring 48 successively extends to three other rigid rectilinear branches B2, B3 and B4 respectively.

The first branch B1 has its proximal end connected to the bend 54, whereas its distal end is axially located off the slider 28 to be connected to the second rigid branch B2.

The second rigid branch B2 is connected to the first rigid branch B1 by a first deformable fold P1.

Like the first branch B1, the second rigid branch B2 is shaped as a strip in the extension of the first rigid branch B1.

In order for the first bend-shaped fold P1 to make up a plastically deformable zone, this portion is mechanically weakened, here by means of a first window or port F1 which is here a rectangular shaped through cut.

In the same way, the third rigid branch B3 is connected to the second rigid branch B2 by a second plastically deformable fold P2.

The second fold P2 is a bent portion of the material strip including a window F2.

Finally, the fourth branch B4 is connected to the third rigid branch B3 through a third plastically deformable fold P3.

The third fold P3 includes a window F3 analogous to the windows F1 and F2.

The fourth rigid branch B4 is rectilinear and with a generally axial orientation parallel to the first rigid branch B1 and it here extends to a front free end segment intended to be directly connected to the associated brake pad 18.

The front free end segment is here made as an extension of the strip making up the branches Bi.

According to the designs illustrated in FIG. 1 or FIG. 5, the front free end segment of the elastic return spring 48 is shaped as an active leg 62 which is bent at right angle to directly act on a portion facing the friction lining-carrying plate (FIG. 1) or to be directly attached to an associated part of the brake pad 18 (FIG. 5), and for example of its friction lining-carrying plate 19.

In the Fig., the elastic return spring 48 is represented in an initial "new" state, that is before any plastic deformation of the folds Pi.

In this new or initial state, the first branch B1 and the fourth rigid branch B4 are substantially parallel to each other and with an axial orientation by being arranged at a transverse distance from each other.

In the maximum plastic deformation state—not represented—of the elastic return spring 48, the first and fourth rigid branches B1 and B4 are still substantially parallel, with an axial orientation and spaced from each other substantially by the same distance, whereas the three folds Pi have been plastically deformed.

By way of example, the thickness of the material sheet is between 0.5 and 0.8 millimetre and the material is a stainless steel with the reference X2CrNbCu21 or the reference 304L (X2CrNi18-9/X2CrNi19-11).

By way of example, the maximum displacement corresponding to a maximum wear "J2" is equal to about 14 millimetres.

When the brake pad 18 is biased to its active position by the piston 46, it first travels the path corresponding to the determined operating play "J1".

During this first part of the stroke, the brake pad 18 drives the branch B4 of the elastic return spring 48 so as to elastically tension the elastic return spring 48 between the attachment portion 50 attached to the fixed support 14, and the branch B4 connected to the brake pad 18.

The elastically deformable parts of the elastic return spring 48 thereby reach their maximum elongation state.

The folds Pi are deformed, first elastically, and then plastically.

The front transverse face of the friction lining 24 of the brake pad 18 is further spaced apart, with respect to the associated annular face or track of the disc 12, by a distance equal to the wear play "J2". The brake pad 18 continues its axial stroke to its active position.

During this second part of the stroke, because the elastically deformable parts cannot be "elastically" deformed any longer, the tightening strain is transmitted to the plastically deformable folds Pi of the elastic return spring 48.

The folds Pi are then plastically deformed, the elastic deformations of the plastically deformable parts being negligible relative to their plastic deformation.

When the braking operation ends, the brake pad 18 is returned to its inactive position by the elastically deformable parts which come back to their idle state.

The brake pad 18 is thus again spaced apart from the disc 12 by a distance equal to only the determined operating play "J1"; the wear play "J2" having been absorbed by the plastic deformation of the plastically deformable folds Pi.

The elastic return spring 48 thus enables to ensure that the brake pad 18 is returned to its inactive position.

Further, the arrangement of the plastically deformable folds Pi prevents the tightening strain to be exerted by the piston 46 in order to actuate the brake pad 18 to its active position from becoming too high.

Further, by preserving a constant operating play "J1" between the brake pad 18 into the inactive position and the disc 12, the response time of the braking system remains constant regardless of the wear of the friction lining 24.

At the maximum full wear of the friction lining, the elastic return spring 48 is plastically deformed and, like the worn brake pad 18, it has to be replaced.

According to both designs schematically illustrated in FIGS. 1 and 5, the elastic return spring includes, in an integrated manner, the active leg 62 intended to "act" on the brake pad 18, and in particular on the lining-carrying plate 19.

An exemplary design according to which the active leg 62 is an independent component of the elastic return spring 48 itself and is attached to the brake pad 18 from which it extends rearwardly along the axial direction, and according to which a front free end segment of the connecting branch B4 and a rear free end segment of the active leg 62 include connecting complementary means by complementary shape cooperation will now be described in reference to FIGS. 6 to 9.

The active leg 62 includes a rear free end segment 64 which is a strip which extends in a vertical axial plane, and an attachment segment 66 which is folded at right angle and which extends in a vertical transverse plane.

For the attachment of the active leg 62, here on a portion facing the lining-carrying plate 19, the attachment segment 66 is crimped by means of a rivet 68 the rod of which not being represented has a non-revolution profile which extends through a complementary hole not being represented of the segment 66 so as to angularly position the active leg 62 with respect to the brake pad 18 with the overall orientation of the segment 64 in a vertical axial plane.

More precisely, the lining-carrying transverse plate 19 is provided with an intermediate plate 120.

Figure 7:
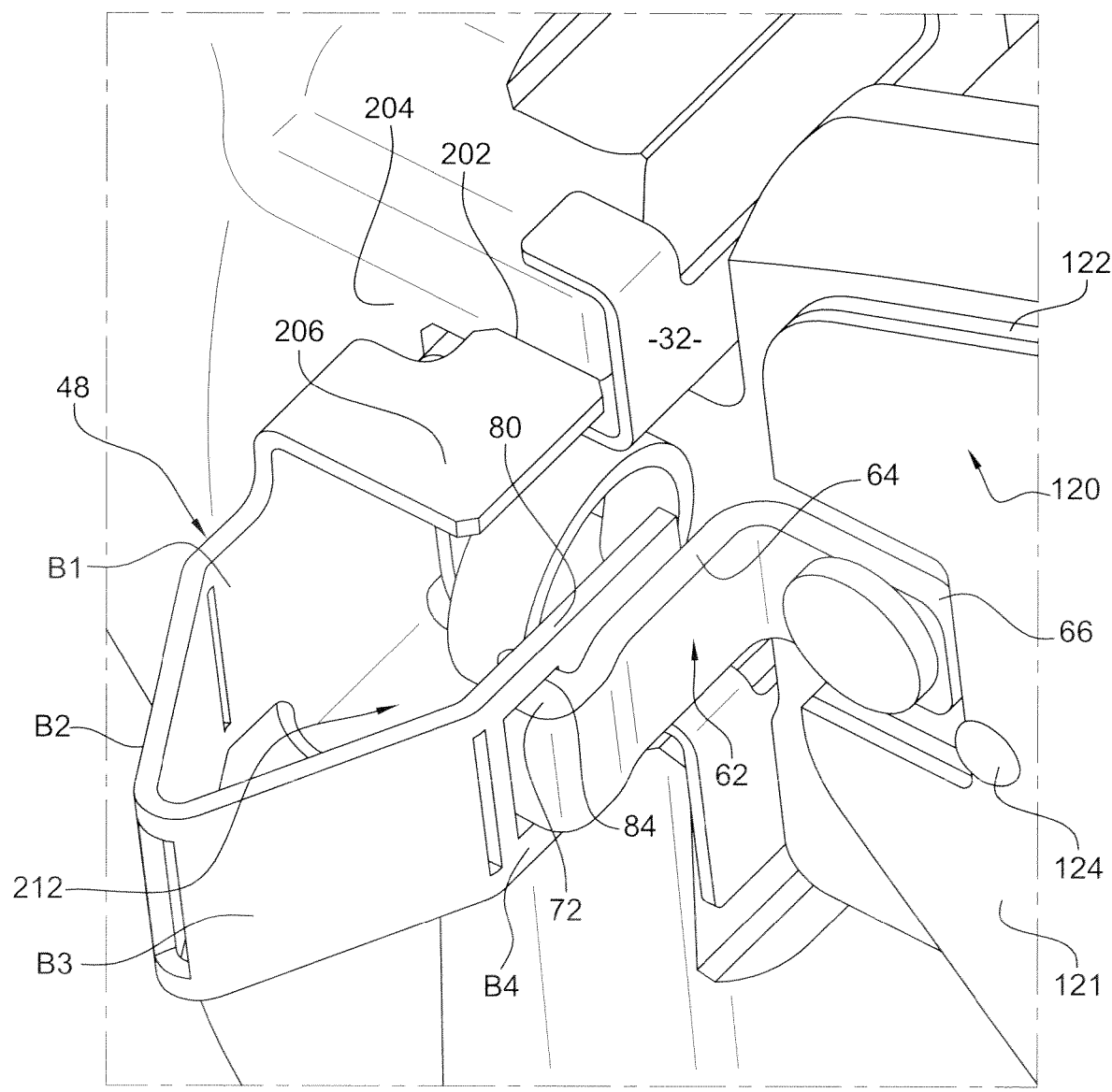
FIG. 7 is a view analogous to that of FIG. 6, at another perspective angle.
Figure 8:
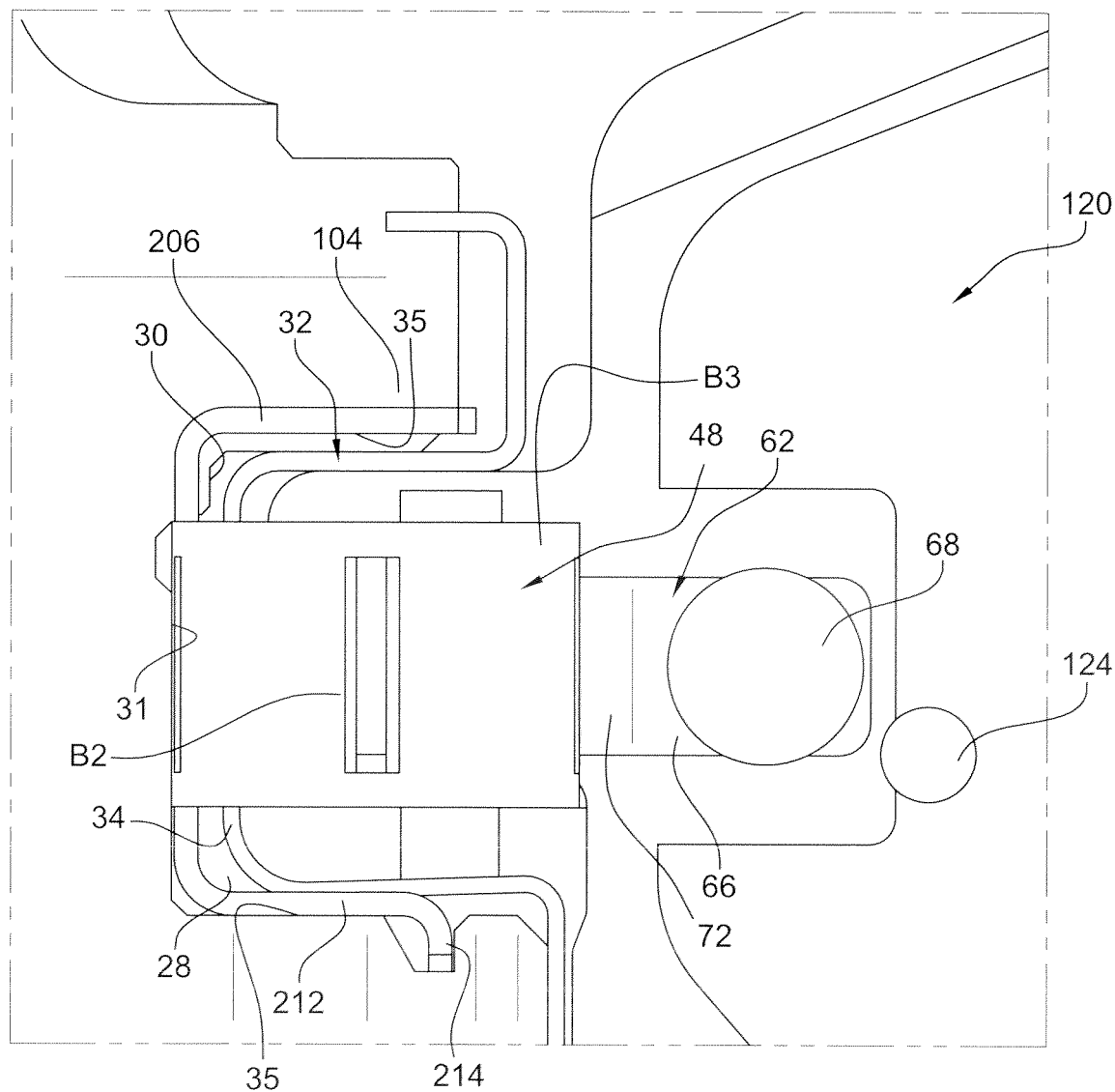
FIG. 8 is an end axial view of the whole illustrated in FIGS. 6 and 7.
Figure 9:
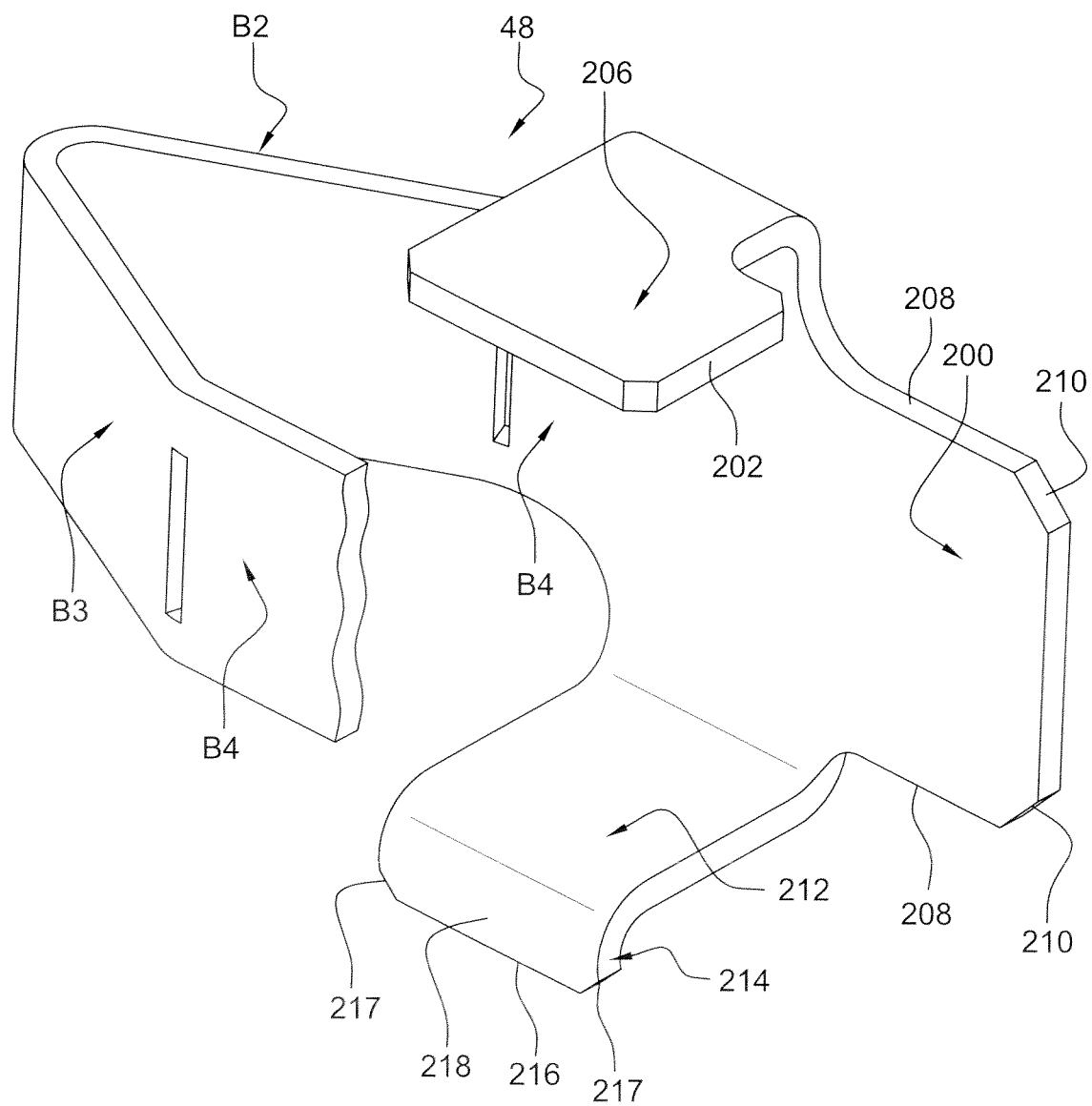
FIG. 9 is a partial cutaway perspective view of the spring illustrated in FIGS. 6 to 8.

The equipment of the lining-carrying plate 19 with such a functional intermediate plate 120 is known, and for example illustrated in FIG. 7 with moreover a plate of elastomeric material 122.

The functions and roles of this type of intermediate plate are well known to those skilled in the art.

The plate 120 is a metal plate, for example of stainless steel, or of rigid material which is axially interposed between the friction lining-carrying plate 19 and a member of the disc brake acting on the brake pad such as for example the piston.

The plate 120 is axially integral with the brake pad, for example by means of rivets 124.

The intermediate plate 120 includes a face 121 intended to be directly or indirectly in contact with the piston.

The rear free end segment 64 includes a hook 70 which transversally extends in a plane orthogonal to the plane of the strip making up the segment 64.

The hook 70 is formed at the end of a finger 72 which delimits a "horizontal" transverse orientation front free edge 74.

It will be noted that each active leg 62 is of an identical design and has a general design symmetry with respect to a median axial transverse plane.

The rigid branch B4 for "connecting" the elastic return spring 48 to the active leg 62 carried by the friction lining 18 extends to a front free end segment 80 able to cooperate with the rear free end segment 64 of the active leg 62.

The segment 80 is a strip which extends in a vertical axial plane and which, in a mounted and assembled position with the segment 64, is in a plane on plane contact with the same, both segment being held one against the other.

The segment 80 includes a detent 84 cut in the segment 80. The detent 84 is in the form of a rectangular window.

The detent 84 is rearwardly axially delimited by a rear edge 88 which, in a mounted and assembled position of both segments 64 and 80 is able to cooperate with the front free edge 74 of the hook 70, during the elastic return of the brake pad 18 rearwardly, to its inactive position.

To allow assembly by axial clamping by elastic deformation, the terminal portion is shaped as a ramp 96.

During assembly of both components, that is when, by a relative axial movement, the elastic return spring 48 is mated with the associated active leg 62, the cooperation bonding complementary means of complementary shapes of the front free end segment of the connecting branch and of the rear free end segment of the active leg cooperate by elastic clamping.

The ramp 92 slightly moves away the finger and the hook 72 and 70, by elastic deformation up to penetration and reception in the detent 84.

Figure 6:
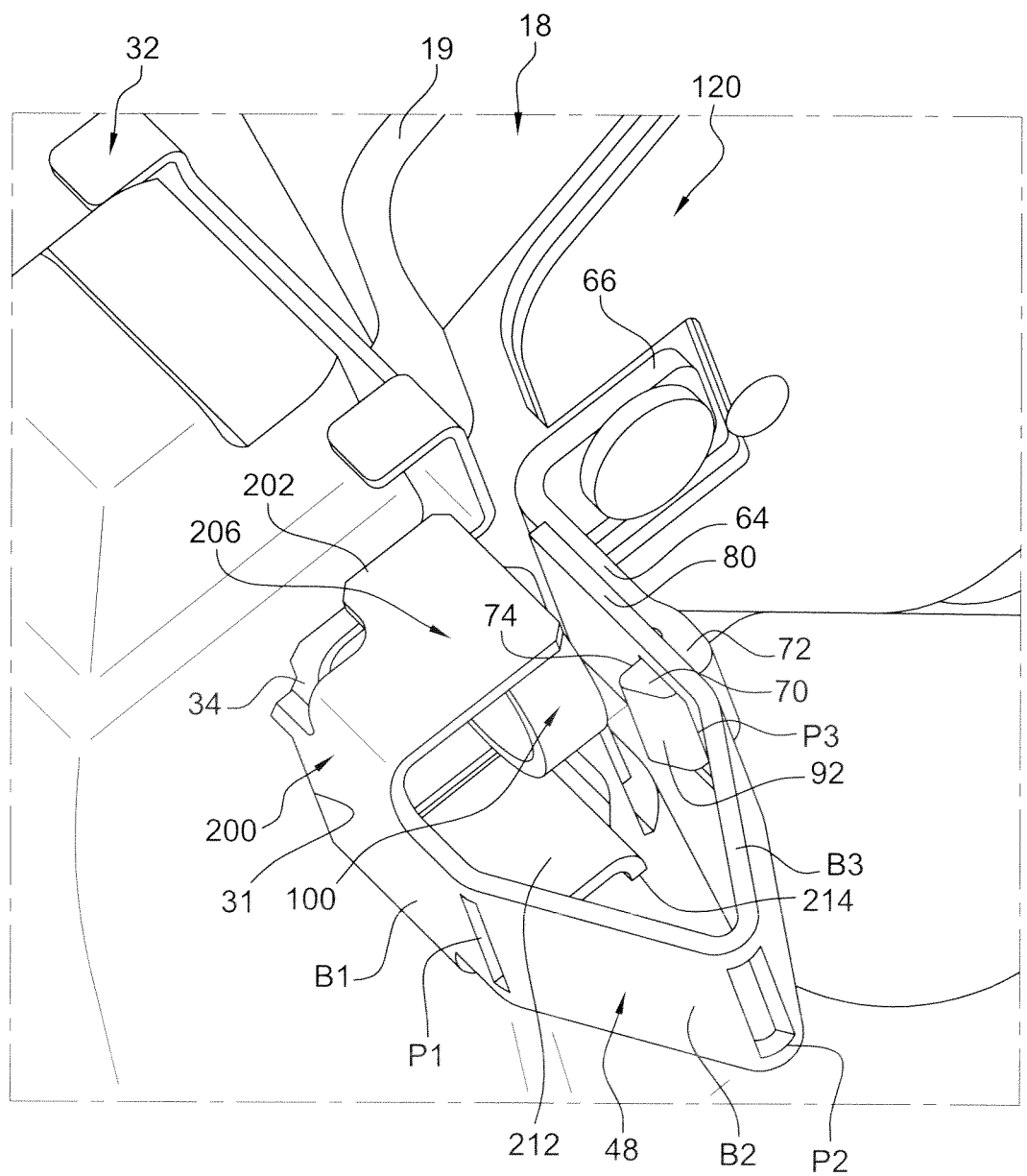
FIG. 6 is a perspective view illustrating an exemplary elastic return spring according to the invention associated with an active leg attached to the brake pad, the whole being illustrated mounted to the disc brake and in a "new" state of the elastic return spring being neither elastically nor plastically deformed.

The result is the state illustrated in FIG. 6 in which:
the front free end segment 80 of the connecting branch B4 is a strip which extends in a vertical axial plane;
the rear free end segment 64 of the active leg 62 is a strip which extends in a plane parallel to that of the segment 80;
the free end segments 64 and 80 are adjacent, plane on plane;
the orthogonal transverse orientation finger 72 carried by the segment 64 is received in a detent 84 formed in the segment 80;
a front edge 74 of the finger cooperates with a rear edge 88 of the detent 84.

For being mounted to the arm 27 of the fixed support 14, the elastic return spring 48 includes a so-called "attachment" portion 50 which is an extension in the form of a blade 200 of the first branch B1.

The blade 200 is planar and rigid with parallel horizontal edges and it is inserted and housed in a complementary machined part 31 formed in the vertical bottom 30, to ensure greater stability to the attachment part and to the elastic return spring 48.

In the new state, as illustrated in the Fig., the blade 200 extends in the extension and in the same axial and vertical plane as that of the first branch B1. The blade 200 makes up the free end segment of the branch B1.

The blade 200 of the portion 50 for attaching the elastic return spring 48 to the fixed support 14 is attached by axial insertion in the associated slider 28, along the vertical bottom 30 which is shaped as an axial notch 31 dimensioned to receive the blade 200, nearly without play.

The blade 200 is thus received and housed between the vertical bottom 30 and the vertical orientation bottom 34 of the associated guide rail 32 which is interposed between the lug 26 of the brake pad and the bottom 30.

More precisely, the notch 31 is machined for example by axial broaching or by milling, and it is delimited by a vertical face 300, and by an upper horizontal face 302.

In a mounted position, the planar outer face 201 transversally bears on the vertical face 300 and the upper horizontal edge 208 of the blade 200 vertically upwardly bears on the upper horizontal face 302, substantially on the entire axial length of the edge 208.

The portion 50 for attaching the elastic return spring 48 to the arm 27 includes a stop 202 which is in contact, axially bearing on, a face 204 facing the arm 27 of the fixed support 14 to block the axial sliding of the elastic return spring 48, axially forwardly, in the direction corresponding to the axial displacement of the brake pad 18 to its active braking position.

The stop 202 belongs to a stop leg 206 which extends from the axial orientation horizontal upper edge 208.

The stop 202 is here a front free end transverse edge of the stop leg 206 which extends in a vertical transverse plane orthogonal to the plane of the blade 200.

The face 204 is advantageously a raw face of the arm of the fixed support not requiring a specific machining.

Thus, the elastic return spring 48 is not attached to the arm 27 as such, but it is axially mounted on the same, by axial introduction of the blade from rear to front, with an axial positioning by bearing the stop 202 onto the surface 204.

The stability of the attachment part is further completed by means of a stabilising leg 212 which extends transverse and horizontal from the lower edge 208 of the blade 200. The stabilising leg extends to an axial vertical orientation mouth 214 the lower horizontal edge 216 of which is received in an axial groove 304 of the slider 28.

The axial groove 304 is made by machining and for example by axial broaching or by milling, in the lower horizontal bottom 35 of the slider 28.

The material removed by machining to make the notch 31 and the groove 304 in the bottoms 30 and 35 has been represented in a cross-hatched manner.

The groove 304 extends axially at least partly along the axial length of the lower horizontal bottom 35, over a sufficient length to allow for axial insertion of the blade 200 until the elastic return spring 48 axially abuts.

The axial groove 304 is delimited by a bottom lower horizontal face 306 and by a lateral vertical face 308, transversally opposite to the vertical face 300 of the notch 31.

Figure 11:
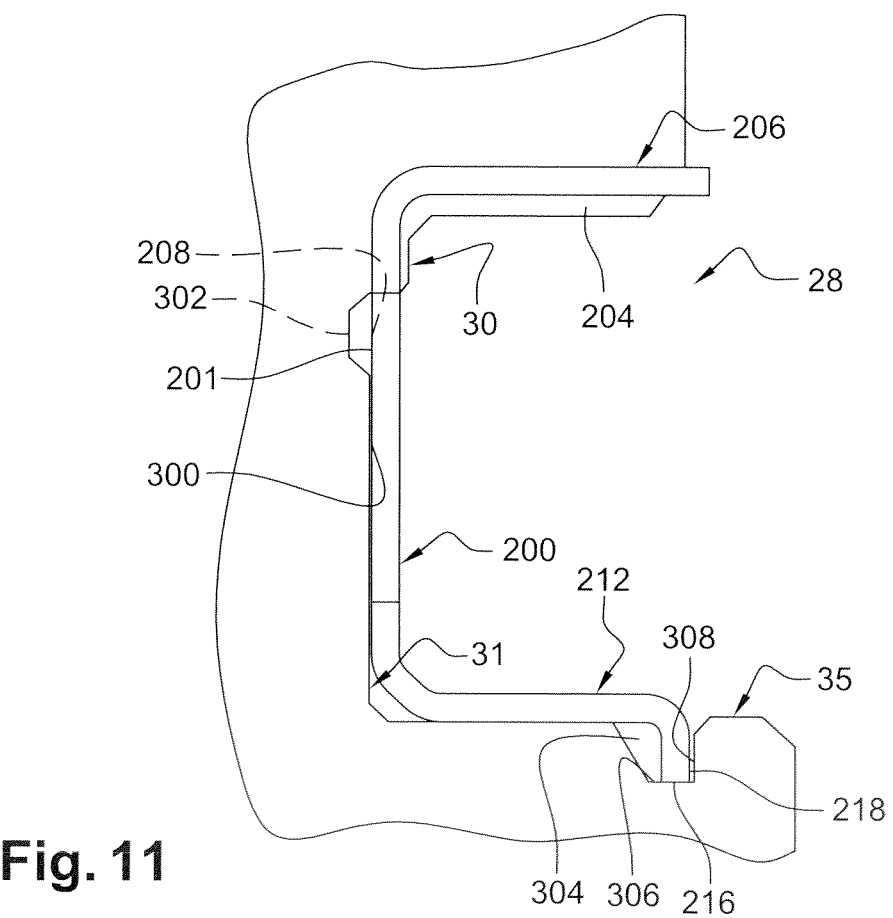
FIG. 11 is a large scale end axial view analogous to that of FIG. 8 which illustrates the mounting of the elastic return spring of FIG. 9.
Figure 10:
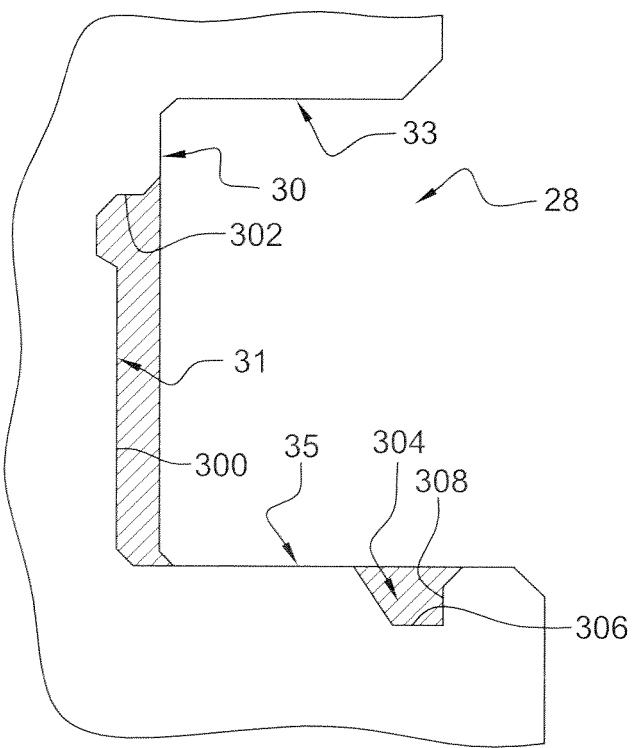
FIG. 10 is a large scale end axial view of the slider illustrated in FIGS. 6 and 7.

In a mounted position of the elastic return spring 48, and as can be seen in particular in FIG. 11, the lower edge 216 vertically bears on the bottom lower face 306 of the groove 304, with a slight elastic pre-stress due to the elastic deformation ability of the stabilising leg 212 when the elastic return spring 48 is mounted.

Accordingly, the holding strains of the elastic return spring 48 are vertically upwardly against the upper face 302 and transversally and horizontally to the left by cooperation of the face 218 of the mouth 214 bearing on the lateral vertical face 308 of the groove 304.

All of the means just described for the axial positioning of the elastic return spring 48, its side holding with respect to the fixed support and its stabilising take the axial strains of displacement of the brake pad, the rotation or switching moment of the spring about an axis radial at its interface with the fixed support, as well as the radial translation strain enabling the brake pad to come back into account.

To facilitate mounting by axial insertion, the front edge of the blade 200 includes chamfers 210, as well as the mouth 214 includes chamfers 217.

Because of the design of the attachment part 50, and in particular of the stop leg 202, both springs 48 equipping a brake pad 18 are not identical and interchangeable, but they make up a pair of two associated springs paired with a front and/or rear brake pad, the design of which is symmetrical with respect to a median vertical axial plane.

The assembly and mounting in a factory is made according to the following method:
a) mounting the opposite guide rails 32;
b) mounting the brake pad 18 equipped with its two radial springs 100;
c) axially mounting of both elastic return springs 48 in the housings 28;
d) axially elastically clamping the elastic return springs 48, each with its associated active leg 62.

A replacement assembly or kit of a used set of brake pads 18 includes, for each brake pad, a new brake pad 18 per se equipped with a pair of associated active legs, and at least one set of two elastic return springs 48 making up a pair of elastic return springs paired with the associated brake pad.

If the brake pad is of the type equipped with pad mounting springs 100, the replacement kit includes, for each brake pad, a new pad equipped with its two pad springs 100, one for each of its two radial lugs 26.

The invention claimed is:

1. A disc brake (10) for an automotive vehicle which includes:
   a brake disc (12) which extends in a plane transverse to an axial orientation axis (A) of rotation of the disc;
   a fixed support (14) which is fixed with respect to a vehicle chassis;
   at least one brake pad (18) which includes a vertical transverse plate (19) which carries a friction lining (24) a friction transverse face (25) of which cooperates with an associated brake track (22) of the disc (12), the brake pad (18) being axially slidingly mounted in the fixed support (14) between an active front position in which said friction face (25) bears on the associated brake track (22) of the disc (12), and an inactive rear position in which said friction face (25) is axially spaced from said associated brake track of the disc, by a determined operating play (J1); and
   at least one elastic return spring (48) for the elastic return of the brake pad (18) to its inactive position including at least one attachment portion (50) for attaching the elastic return spring (48) on the fixed support (14) and including a connecting branch (B4) which is directly or indirectly connected to the brake pad (18),
   wherein said at least one brake pad (18) includes at least one slidably guiding side lug (26) which is received in an axial orientation slider (28) of the fixed support (14);
   wherein the attachment portion (50) for attaching the elastic return spring (48) to the disc brake (12) includes a rigid blade (200) which extends in a plane parallel to an axial displacement direction (A) of the brake pad (18), and which is axially inserted in said axial orientation slider (28) of the fixed support (14),
   wherein the blade (200) is planar and rigid with parallel edges and is axially inserted and housed in a complementary notch (31) of said slider (28),
   wherein the attachment portion (50) for attaching the elastic return spring (48) to the fixed support (14) includes a stop (202) which is in contact with a face (204) facing the fixed support (14) to block the axial sliding of the elastic return spring (48) in the direction corresponding to the axial displacement of the brake pad (18) to its active braking position, the stop (202) extending in a first direction from a first side of the attachment portion (50), and wherein the attachment portion (50) for attaching the elastic return spring (48) to the fixed support (14) includes a stabilizing leg (212) of the elastic return spring (48) which cooperates with a portion of said slider (28), the stabilizing leg (212) extending in a second direction from a second side of the attachment portion (50), the first side and the second side of the attachment portion being different sides of the attachment portion.

2. The disc brake according to claim 1, wherein:

said slider (28) has, in a cross-section by a vertical transverse plane orthogonal to the axis of rotation of the disc, a "C" shape transversally open to the associated side lug (26) of the brake pad (18);

the slider (28) is transversally delimited by an axial orientation vertical bottom (30);

said notch (31) is formed in said vertical bottom (30).

3. The disc brake according to claim 2, wherein said notch (31) is a machined notch.

4. The disc brake (10) according to claim 1, wherein:

the disc brake includes a guide rail (32) which snugly fits into the walls of said slider (28) and which is attached to the fixed support (14); and the blade (200) is transversally arranged between said vertical bottom (30) and a vertical orientation bottom (34) facing said guide rail (32).

5. The disc brake according to claim 1, wherein said stop (202) belongs to a stop leg (206) which extends from an axial orientation edge (208) of the elastic return spring (48).

6. The disc brake according to claim 1, wherein said stabilising leg (212) transversally and horizontally extends from an axial orientation edge (208) of the elastic return spring (48).

7. The disc brake according to claim 6, wherein:

said slider (28) is vertically delimited by an axial orientation horizontal bottom (35); and said stabilising leg (212) extends to an axial vertical orientation mouth (217) a free end edge (218) of which is received in an axial groove (216) which is formed in said horizontal bottom of said slider (28).

8. The disc brake according to claim 1, wherein said connecting branch (B4) is an axial orientation rigid branch parallel to the sliding direction of the brake pad (18).

9. The disc brake (10) according to claim 1, wherein the elastic return spring (48) includes means for compensating for a wear play (J2) of the friction lining (24) of the brake pad (18), which are plastically deformed when a stroke of the brake pad to its active braking position, is higher than said determined operating play (J1).

10. The disc brake (10) according to claim 1, wherein the elastic return spring (48) is a single piece of a material sheet.

11. A replacement kit for a disc brake of an automotive vehicle according to claim 1, the kit comprising the at least one brake pad (18) and two of the at least one elastic return spring (48) paired with said brake pad (18), each elastic return spring comprising:

the attachment portion (50) for attaching the elastic return spring (48) to the disc brake (14); and the connecting branch (B4) which is directly or indirectly connected to the brake pad (18);

wherein the attachment portion (50) for attaching the elastic return spring (48) to the disc brake (12) includes the rigid blade (200) which extends in a plane parallel to the axial displacement direction (A) of the brake pad (18), to be axially inserted in a complementary portion of the disc brake.

12. The replacement kit according to claim 11, further comprising two springs (100) for mounting the brake pad into the disc brake.

13. The disc brake (10) according to claim 1, wherein the elastic return spring (48) is a single piece.

14. A spring (48) for the axial elastic return of a brake pad (18), of a disc brake (12), to an inactive position, wherein the elastic return spring (48) includes:

an attachment portion (50) for attaching the elastic return spring (48) to the disc brake (14); and a connecting branch (B4) which is directly or indirectly connected to the brake pad (18);

wherein the attachment portion (50) for attaching the elastic return spring (48) to the disc brake (12) includes i) a rigid blade (200) which extends in a plane parallel to an axial displacement direction (A) of the brake pad (18), to be axially inserted in a complementary portion (28, 31) of the disc brake, ii) a stop (202) which is in contact with a face (204) facing the fixed support (14) to block the axial sliding of the elastic return spring (48) in the direction corresponding to the axial displacement of the brake pad (18) to its active braking position, the stop (202) extending in a first direction from a first side of the attachment portion (50), and iii) a stabilizing leg (212) of the elastic return spring (48) which cooperates with a portion of said slider (28), the stabilizing leg (212) extending in a second direction from a second side of the attachment portion (50), the first side and the second side of the attachment portion being different sides of the attachment portion.

15. The spring according to claim 14, wherein said stabilizing leg (212) extends from an axial orientation edge (208) of the elastic return spring (48).

16. The spring according to claim 14, wherein said stabilising leg (212) transversally and horizontally extends from an axial orientation edge (208) of the elastic return spring (48).

17. The spring according to claim 14, wherein said connecting branch (B4) is an axial orientation rigid branch parallel to the sliding direction of the brake pad (18).

18. The spring according to claim 14, further comprising means for compensating for a wear play (J2) of a friction lining (24) of the brake pad (18), which are interposed between said attachment portion and said connecting branch (B4), and which are plastically deformed when a stroke of the brake pad (18), along an axial displacement direction to an active braking position, is higher than a determined operating play (J1).

19. The spring according to claim 14, wherein the spring is a single piece of a material sheet.

20. The spring according to claim 14, wherein the spring is a single piece.

21. A disc brake (10) for an automotive vehicle, comprising:

a brake disc (12) which extends in a plane transverse to an axial orientation axis (A) of rotation of the disc;

a fixed support (14) which is fixed with respect to a vehicle chassis;

at least one brake pad (18) which includes a vertical transverse plate (19) which carries a friction lining (24) a friction transverse face (25) of which cooperates with an associated brake track (22) of the disc (12), the brake pad (18) being axially slidingly mounted in the fixed support (14) between an active front position in which said friction face (25) bears on the associated brake track (22) of the disc (12), and an inactive rear position in which said friction face (25) is axially spaced from said associated brake track of the disc, by a determined operating play (J1); and at least one elastic return spring (48) for the elastic return of the brake pad (18) to its inactive position including at least one attachment portion (50) for attaching the elastic return spring (48) on the fixed support (14) and including a connecting branch (B4) which is directly or indirectly connected to the brake pad (18), wherein said at least one brake pad (18) includes at least one slidably guiding side lug (26) which is received in an axial orientation slider (28) of the fixed support (14), wherein the attachment portion (50) for attaching the elastic return spring (48) to the disc brake (12) includes a rigid blade (200) which extends in a plane parallel to an axial displacement direction (A) of the brake pad (18), and which is axially inserted in said axial orientation slider (28) of the fixed support (14), wherein the blade (200) is planar and rigid with parallel edges and is axially inserted and housed in a complementary notch (31) of said slider (28), wherein the disc brake includes a guide rail (32) which snugly fits into the walls of said slider (28) and which is attached to the fixed support (14); and wherein the blade (200) is transversally arranged between said vertical bottom (30) and a vertical orientation bottom (34) facing said guide rail (32).

\* \* \* \* \*